United States Patent
Proulx et al.

(10) Patent No.: US 7,919,028 B2
(45) Date of Patent: *Apr. 5, 2011

(54) METHOD OF MANUFACTURING NOISE ATTENUATING FLEXIBLE CUTTING LINE FOR USE IN ROTARY VEGETATION TRIMMERS

(75) Inventors: Richard A. Proulx, Alta Loma, CA (US); William P. Conley, Thousand Oaks, CA (US); Rodger D. Thomason, Santa Monica, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,791

(22) Filed: May 14, 2010

(65) Prior Publication Data

US 2010/0225021 A1    Sep. 9, 2010

Related U.S. Application Data

(60) Division of application No. 11/429,029, filed on May 5, 2006, now Pat. No. 7,718,103, which is a continuation of application No. 10/713,485, filed on Nov. 14, 2003, now abandoned, which is a continuation-in-part of application No. 09/943,248, filed on Aug. 29, 2001, now Pat. No. 6,910,277.

(51) Int. Cl.
*B29C 47/12* (2006.01)
(52) U.S. Cl. ............. 264/177.13; 264/177.17; 264/210.2
(58) Field of Classification Search ............. 264/177.17, 264/177.13, 210.2
See application file for complete search history.

(56) References Cited

U.S. PATENT DOCUMENTS

| | | | | | |
|---|---|---|---|---|---|
| 4,288,463 | A | * | 9/1981 | Groff et al. | 426/500 |
| 4,504,432 | A | * | 3/1985 | Kamei et al. | 264/177.13 |
| 5,609,903 | A | * | 3/1997 | Israel et al. | 426/500 |
| 5,807,462 | A | * | 9/1998 | Proulx | 156/433 |

* cited by examiner

*Primary Examiner* — Joseph S Del Sole
*Assistant Examiner* — Kimberly A Stewart
(74) *Attorney, Agent, or Firm* — Holland & Knight LLP; Richard E. Lyon, Jr.

(57) ABSTRACT

A process for forming flexible noise attenuating cutting line for use in rotary vegetation trimmers formed of at least two monofilament polymer strands bonded together in a twisted disposition or a single strand twisted about its central axis in which the strand or strands are extruded in a molten disposition through a single die that is rotated during the extruding step either to twist the two strands together about a central longitudinal axis or a single strand about its own longitudinal axis such that upon cooling, stretching and heating, a flexible noise attenuating line is created in a continuous online process.

9 Claims, 9 Drawing Sheets

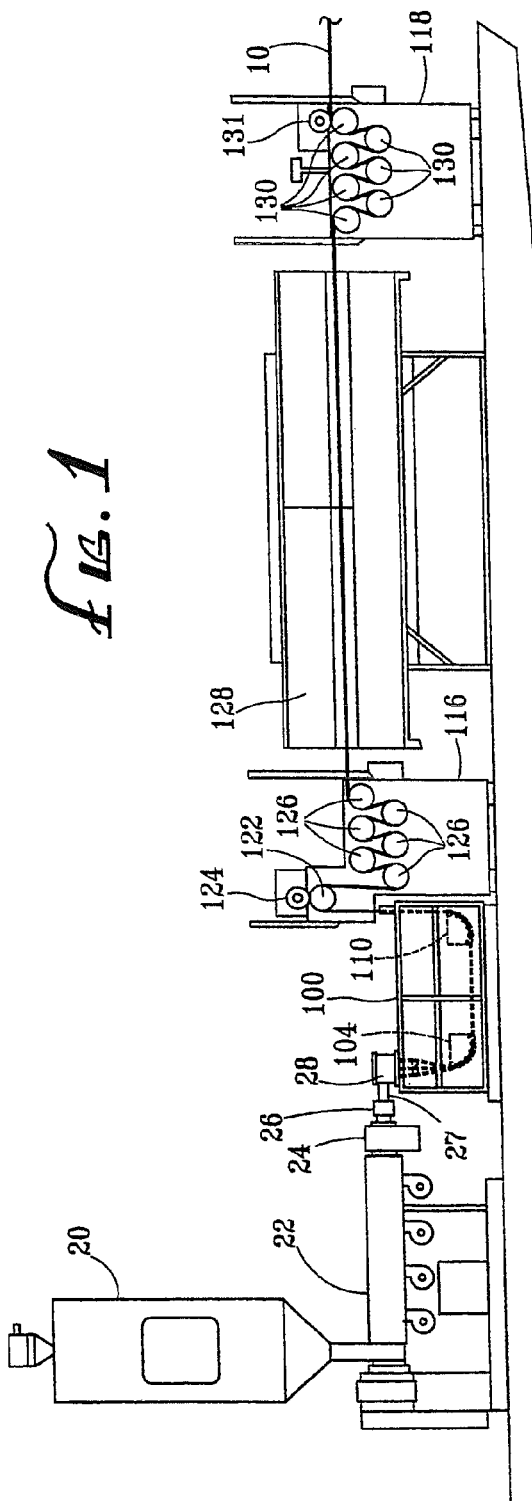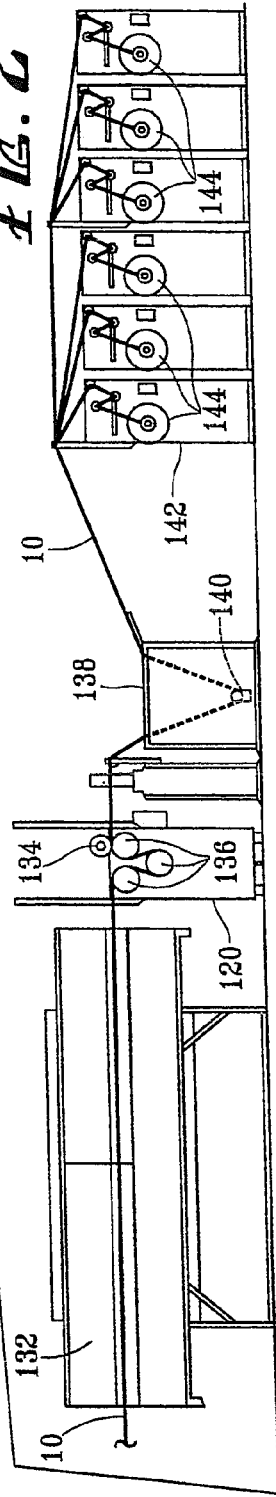

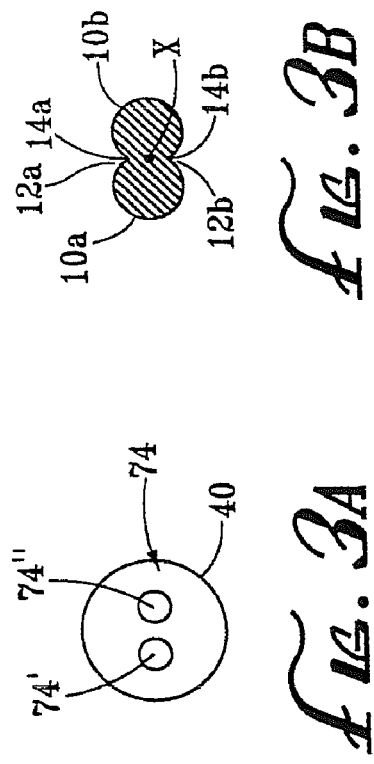
FIG. 3A
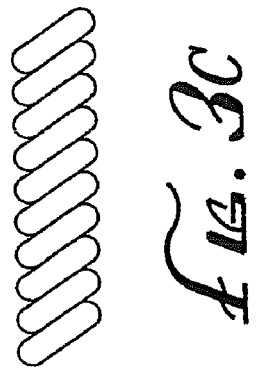
FIG. 3B
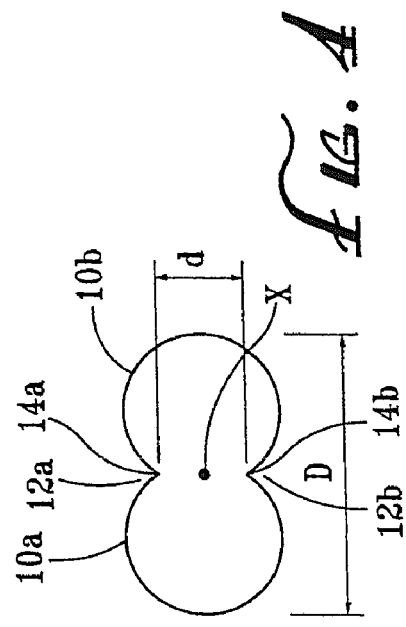
FIG. 3C
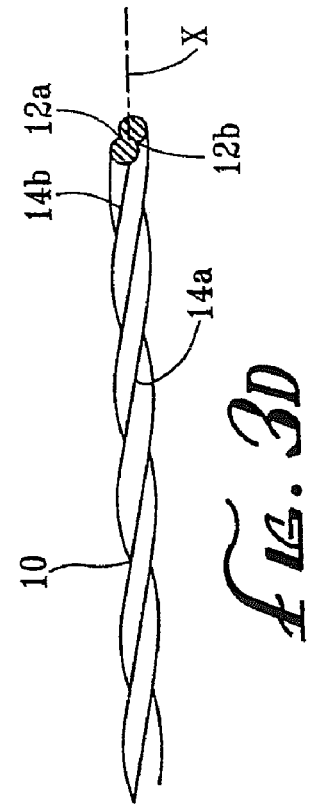
FIG. 3D
FIG. 4

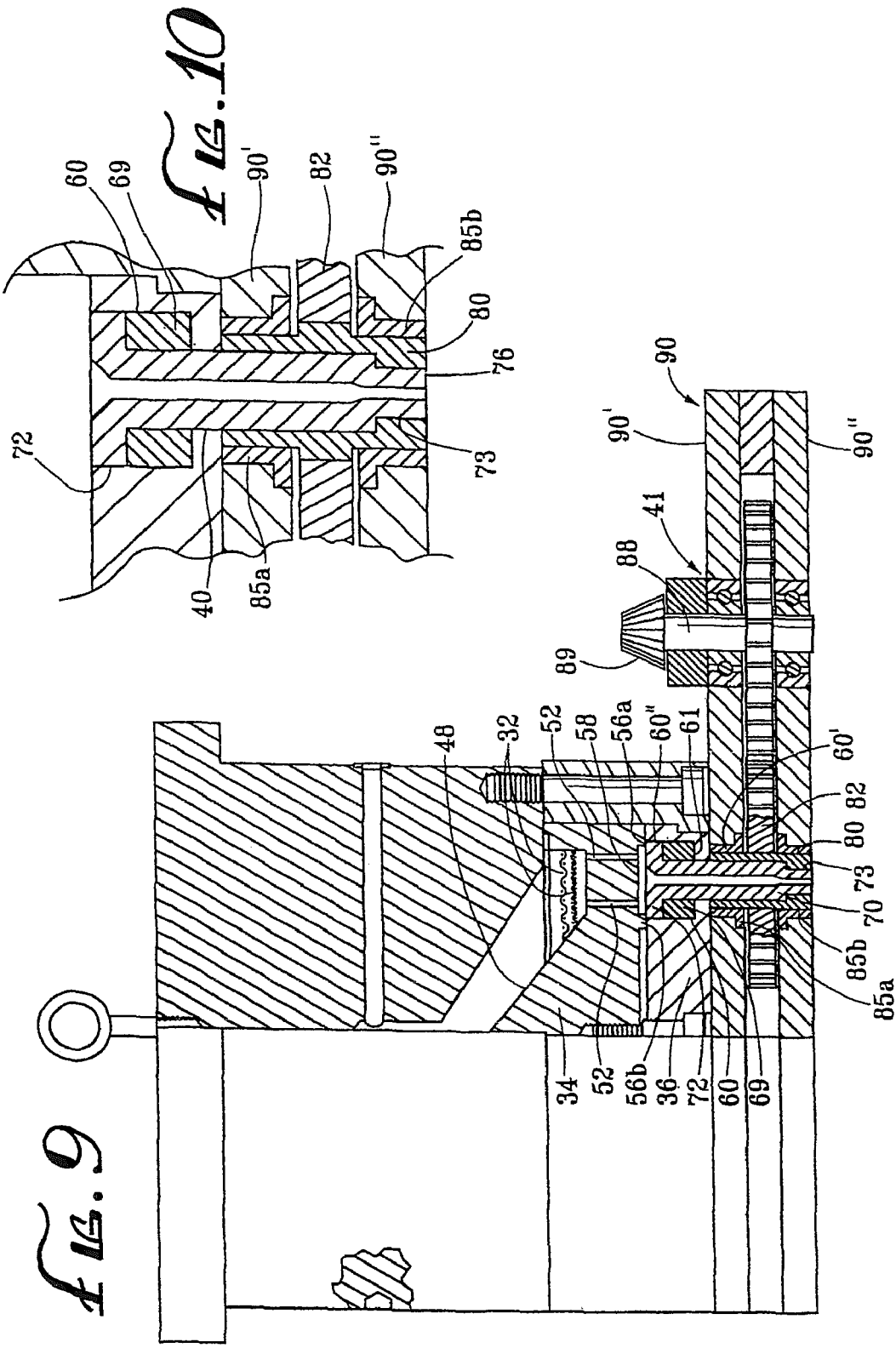

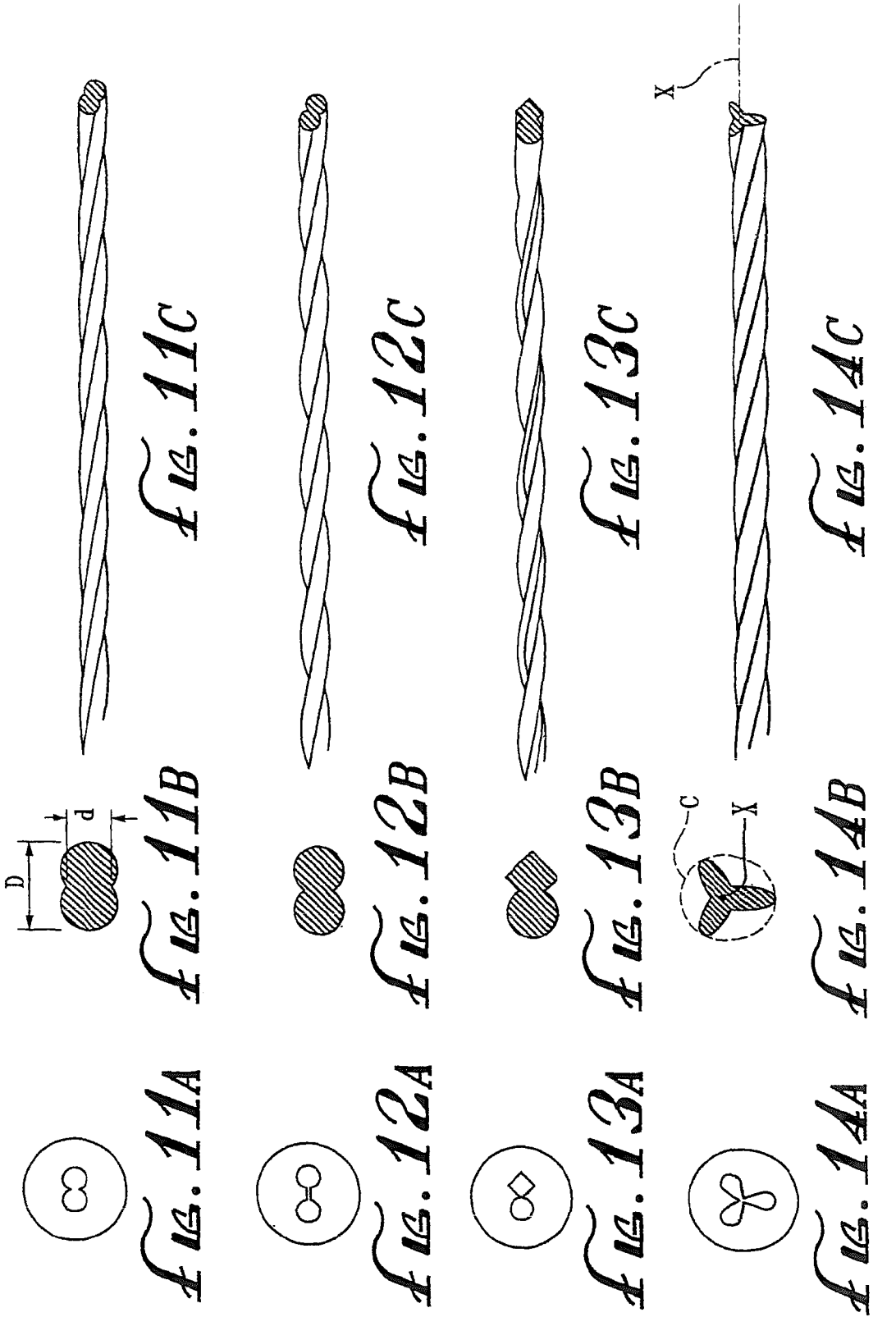

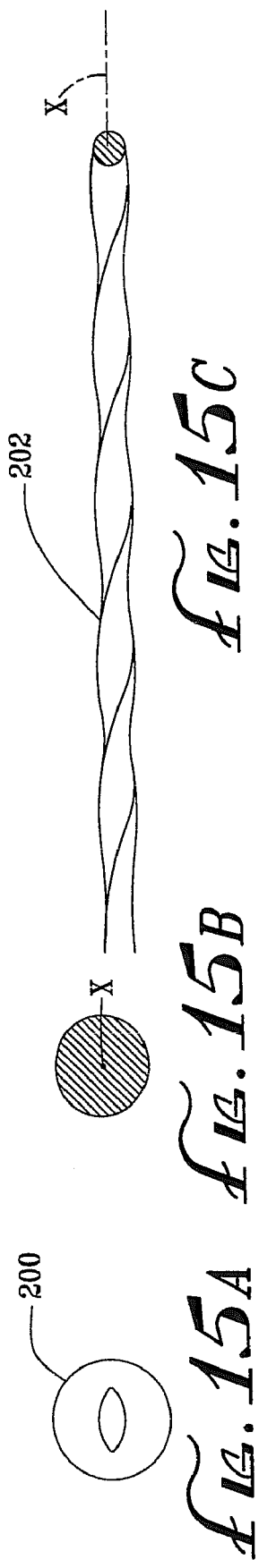
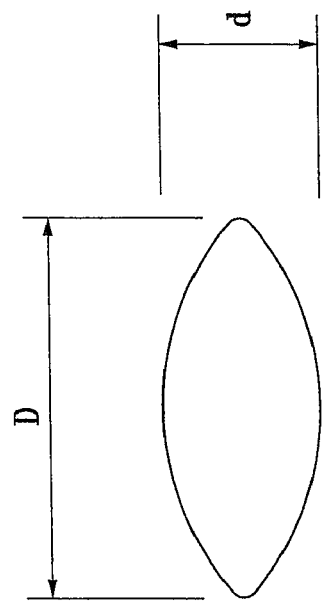

', '# METHOD OF MANUFACTURING NOISE ATTENUATING FLEXIBLE CUTTING LINE FOR USE IN ROTARY VEGETATION TRIMMERS

CROSS-REFERENCE TO RELATED APPLICATIONS

This is a divisional application of U.S. patent application Ser. No. 11/429,029 filed May 5, 2006, which is a continuation of U.S. patent application Ser. No. 10/713,485 filed Nov. 14, 2003 (Abandoned), which is a continuation-in-part of U.S. patent application Ser. No. 09/943,248, filed Aug. 29, 2001, entitled "Noise Attenuating Flexible Cutting Line for Use in Rotary Vegetation Trimmers and Method of Manufacture," now U.S. Pat. No. 6,910,277, issued Jun. 28, 2005.

BACKGROUND OF THE INVENTION

The present invention is directed to an improved flexible cutting line for use in rotary trimmers and the method and apparatus employed in the manufacture of such line. Flexible line rotary trimmers are used for cutting vegetation, such as grass and weeds, particularly along walks, fences and flowerbeds and around trees. These devices comprise a motor-driven rotary head which carries one or more lengths of monofilament line mounted on a spool within a housing. Extended end portions of each line project from the spool through guides in the side of the housing. As the head rotates at high speed, the end portions of the line are caused to project outwardly from the housing by the centrifugal forces acting thereon and function as cutting blades. The majority of trimmer heads presently in use employ two separate monofilament nylon lines which are both mounted on a common spool and project from the spool and housing through diametrically opposed guides in the trimmer housing.

The speeds at which these rotary trimmers rotate is generally within the range of 5,000 to 10,000 rpm. At these speeds, the projecting nylon lines generate considerable noise which most people find quite objectionable. In trimmers having electric motors, this noise is considerably louder than that generated by the motor. As a result, efforts have been ongoing to develop a suitable cutting line for such trimmers that generate less noise during use. In gas-powered trimmers, the drive engines are quite loud. However, the high pitch whine given off by the nylon slicing through the air and brush appears to travel further than the lower frequency engine noise and is very noticeable to people not in the immediate proximity of the rotating trimmer head. Thus, a noise attenuating cutting line would also be quite useful in gas-powered trimmers. As legislative pressure continues to force manufacturers to develop quieter gas-powered engines for these trimmers, the need for a noise attenuating cutting line will only increase.

While efforts to develop suitable cutting lines for rotary trimmers that produce less noise during use have met with some success, the noise attenuating characteristics of such lines still leaves room for improvement. In addition, the configurations of such lines generally require secondary processing steps, such as notching or cutting grooves of varying numbers in the line. Tightly twisting a formed filament of square cross-section has also been employed to attenuate noise. However, as a result of such modifications, the surface quality and durability of the line is adversely affected and the cost of manufacture is significantly increased. It therefore would be highly desirable to produce a flexible cutting line for rotary trimmers that not only generates less noise than those lines currently in use but also is quite durable and capable of being manufactured without the need for costly secondary processing. It would also be desirable if the efficiency of the line slicing through the air could be sufficiently increased such that not only was the noise of the rotating line significantly attenuated but also the vibration in the rapidly rotating head and the drag on the drive motor were reduced as well. Such an improvement would reduce the strain on the operator and, in the case of gas-powered trimmers, reduce fuel consumption and emissions. When used with heads powered by electric motors, such line would reduce the amperage drawn by the motor and, with battery-powered trimmers, it would extend the life of the batteries. The flexible cutting line of the present invention obtains these results.

SUMMARY OF THE INVENTION

Briefly, the present invention comprises a noise attenuating flexible trimmer line and its method of manufacture. In a first preferred embodiment, the line is comprised of two or more monofilament strands twisted together in a molten state such that upon being cooled in a quench bath, reheated, drawn and cured, the strands are continuously bonded together along their lengths so as to form a single twisted length of cutting line having a plurality of inwardly directed and generally V-shaped troughs terminating in fused seams that extend continuously in a helical disposition about and along the length of the line. By increasing the number of twists per unit length of line, the angle formed by the trough relative to the longitudinal axis of the line is increased and the noise attenuation of the line is enhanced.

The cross-section of the formed line defines a major diameter wherein the transverse distance across the line is at a maximum and a minor diameter extending through at least one of the troughs in the line wherein the transverse dimension across the line is at a minimum. The major diameter defines the line size. While the individual strands can be extruded in a wide variety of cross-sectional configurations, strands having a circular cross-section are preferred. In the cutting line of the present invention wherein the two individual strands are circular in cross-section prior to bonding, increasing the difference between the major diameter and minor diameter for each line size, further enhances the noise attenuation of the line.

In an alternate embodiment, the line is comprised of a single monofilament strand, preferably oblately-shaped in cross-section, that is twisted while in a molten state such that, upon being cooled in a quench bath, reheated, drawn and cured, the strand defines a twisted length of cutting line having a slightly out-of-round cross-section that extends continuously in a helical disposition along the entire length of the line. The resultant cutting line, while not as quiet as the line of the prior embodiment, does provide significant noise attenuation as compared to conventional cylindrical line and provides a greater cutting mass for a given major diameter than a line of the first embodiment having the same major diameter.

It is the principal object of the present invention to provide an improved monofilament cutting line for use in rotary trimmers.

It is another object of the present invention to provide a monofilament cutting line for rotary trimmers that generates less noise during use than the cutting lines heretofore available for use in such trimmers.

It is another object of the present invention to provide a noise attenuating monofilament cutting line for rotary trimmers that is economical to manufacture.

It is yet another object of the present invention to provide a monofilament cutting line for rotary trimmers that reduces vibration in the rotary head during use.

It is a still further object of the present invention to provide a monofilament cutting line for rotary trimmers that decreases the drag on the drive motor during use.

It is another object of the present invention to provide a noise attenuating monofilament cutting line for rotary trimmers that is wear resistant.

It is still another object of the present invention to provide a monofilament noise attenuating cutting line for rotary trimmers that can be manufactured in a continuous forming process without the need for secondary processing.

It is an even further object of the present invention to provide a manufacturing process for continuously forming a monofilament noise attenuating cutting line for rotary trimmers.

These and other objects and advantages of the present invention will become readily apparent from the following detailed description taken in conjunction with the accompanying drawings.

BRIEF DESCRIPTION OF THE DRAWINGS

FIG. 1 is a schematic representation of a first portion of a manufacturing process of the present invention.

FIG. 2 is a schematic representation of the remainder of the manufacturing process of the present invention.

FIG. 3A is a bottom plan view of a rotatable extrusion die employed in the production of the preferred embodiment of the noise attenuating cutting line of the present invention.

FIG. 3B is a sectional view of the preferred embodiment of the noise attenuating cutting line of the present invention.

FIG. 3C is a perspective view of a length of the preferred embodiment of the noise attenuating cutting line of the present invention during the forming process.

FIG. 3D is a perspective view of a fully cured length of the preferred embodiment of the noise attenuating cutting line of the present invention with the extended end thereof turned outwardly.

FIG. 4 is an enlarged end view of the preferred embodiment of the noise attenuating cutting line of the present invention illustrating the major and minor diameters of the line.

FIG. 9 is an enlarged partial sectional view of the spin pack and drive assemblies of the present invention.

FIG. 10 is a partial sectional view of one of the rotating dies employed in the present invention.

FIG. 11A is a bottom plan view of a rotatable extrusion die for use in the manufacturing process of the present invention and illustrating an alternative die hole configuration.

FIG. 11B is a sectional view of the embodiment of the noise attenuating line of the present invention formed using the die hole configuration illustrated in FIG. 11A.

FIG. 11C is a perspective view of a length of noise attenuating cutting line of the present invention formed with the die hole configuration illustrated in FIG. 11A and showing the extended end thereof turned outwardly.

FIG. 12A is a bottom plan view of a rotatable extrusion die for use in the manufacturing process of the present invention and illustrating a second alternative die hole configuration.

FIG. 12B is a sectional view of the embodiment of the noise attenuating line of the present invention formed using the die hole configuration illustrated in FIG. 12A.

FIG. 12C is a perspective view of a length of noise attenuating cutting line of the present invention formed with the die hole configuration illustrated in FIG. 12A and showing the extended end thereof turned outwardly.

FIG. 13A is a bottom plan view of a rotatable extrusion die for use in the manufacturing process of the present invention and illustrating a third alternative die hole configuration.

FIG. 13B is a sectional view of the embodiment of the noise attenuating line of the present invention formed using the die hole configuration illustrated in FIG. 13A.

FIG. 13C is a perspective view of a length of noise attenuating cutting line of the present invention formed with the die hold configuration illustrated in FIG. 13A and showing the extended end thereof turned outwardly.

FIG. 14A is a bottom plan view of a rotatable extrusion die for use in the manufacturing process of the present invention and illustrating a fourth alternative die hole configuration.

FIG. 14B is a sectional view of the embodiment of the noise attenuating line of the present invention formed using the die hole configuration illustrated in FIG. 14A.

FIG. 14C is a perspective view of a length of noise attenuating cutting line of the present invention formed with the die hole configuration illustrated in FIG. 14A and showing the extended end thereof turned outwardly.

FIG. 15A is a bottom plan view of a rotatable extrusion die for use in the manufacturing process of the present invention employing a single twisted strand to form the noise attenuating configuration.

FIG. 15B is a sectional view of the embodiment of the noise attenuating line of the present invention formed using the die hole configuration illustrated in FIG. 15A.

FIG. 15C is a perspective view of a length of noise attenuating cutting line of the present invention formed with the die hole configuration illustrated in FIG. 15A and showing the extended end thereof turned outwardly.

FIG. 15D is an enlarged cross-sectional view of the line illustrated in FIGS. 15B and 15C.

DESCRIPTION OF THE PREFERRED EMBODIMENT

Figure 5:
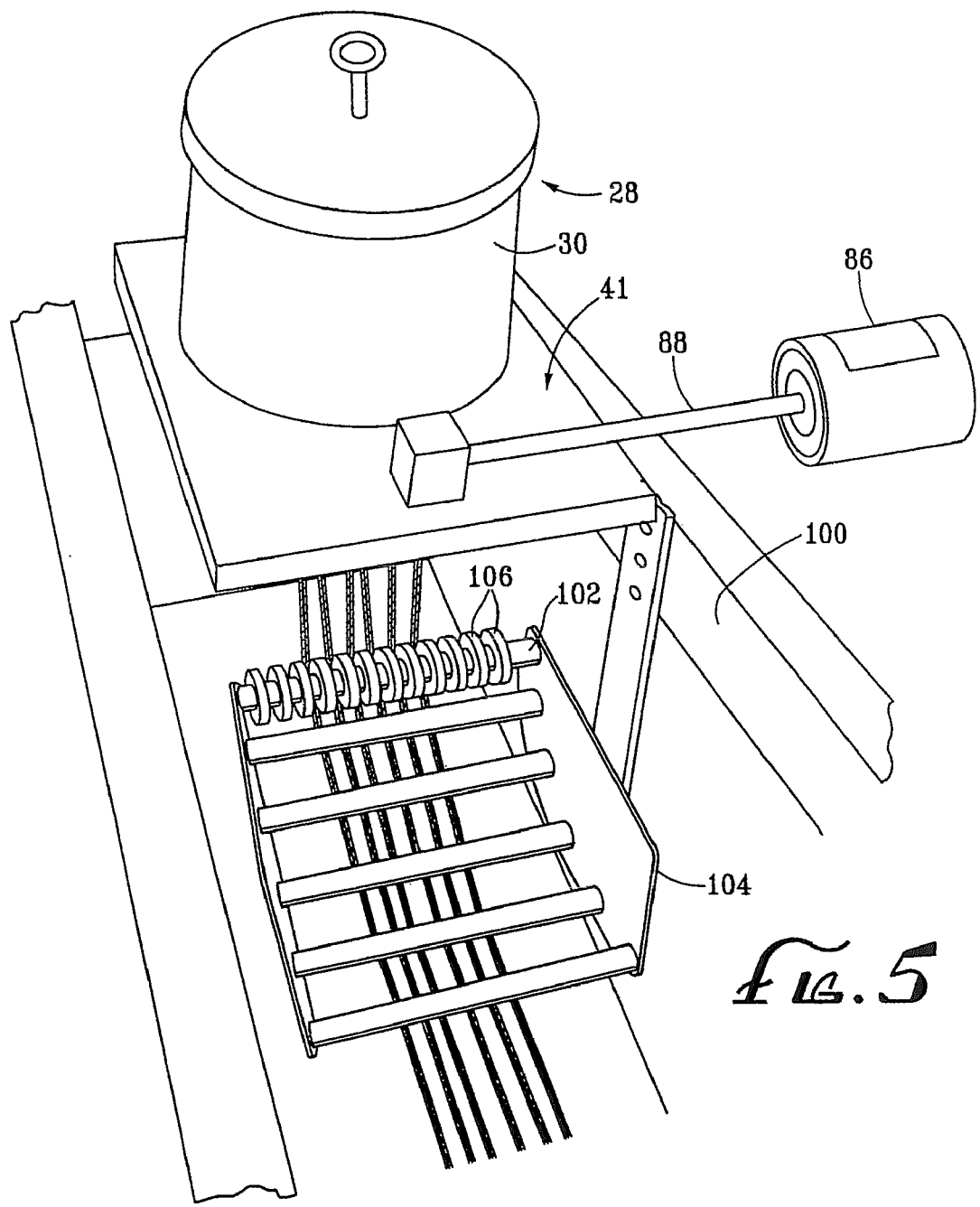
FIG. 5 is a perspective view of the upstream portion of the manufacturing process of the present invention.

Referring now in detail to the drawings, the process of the present invention is schematically represented in FIGS. 1 and 2. The result of the process is a noise attenuating monofilament cutting line 10 comprised of two or more monofilament strands continuously bonded together in a twisted configuration. In a preferred embodiment of the cutting line 10 illustrated in FIGS. 3A and 3B, two strands 10a and 10b having cylindrical cross-sections are bonded together in a twisted disposition about a central axis X so as to form a pair of overlapping cylindrical line portions twisted together to define a single length of cutting line 10. Line 10 defines a pair of inwardly directed and generally V-shaped troughs 12a and 12b terminating in fused seams 14a and 14b that extend continuously in helical dispositions about and along the length of the line. It is to be understood that the cutting line of the present invention could be formed with the same process so as to be comprised of more than two twisted and bonded strands (see, e.g., FIGS. 14B and 14C) or wherein at least one of the strands is non-circular in cross-section (see, e.g., FIGS. 13B and 13C). The process can also be used to form a noise attenuating cutting line from a single twisted strand that is preferably slightly oblate in cross-section (see, e.g., FIGS. 15B-15D). While these different embodiments will be discussed later herein, the initial description will be with reference to the preferred embodiment of the cutting line illustrated in FIGS. 3B and 3D.

Line 10 is preferably constructed of an extrusile nylon copolymer grade 6/6,9 material. However, other material compositions used in the formation of conventional rotary trimmer cutting line could also be employed. In manufacturing the noise attenuating line 10, a supply of the nylon copolymer material is disposed in a hopper 20 and selectively fed through an extruder 22, a screen changer/filter assembly 24, a metering pump 26, a nozzle 27 and a plurality of rotating extrusion dies 40 mounted in a spin pack assembly 28. As the molten material passes through the spin pack assembly 28, a plurality of pairs of monofilament strands 10*a* and 10*b* are concurrently extruded and the two strands in each pair are twisted together by the rotating dies 40 to initiate the formation of a plurality of lengths of cutting line 10. The formed molten lengths of line 10 are then cooled in a quench bath, stretched and heated, reheated, cooled and collected as in the formation of conventional monofilament cutting line.

Figure 7:
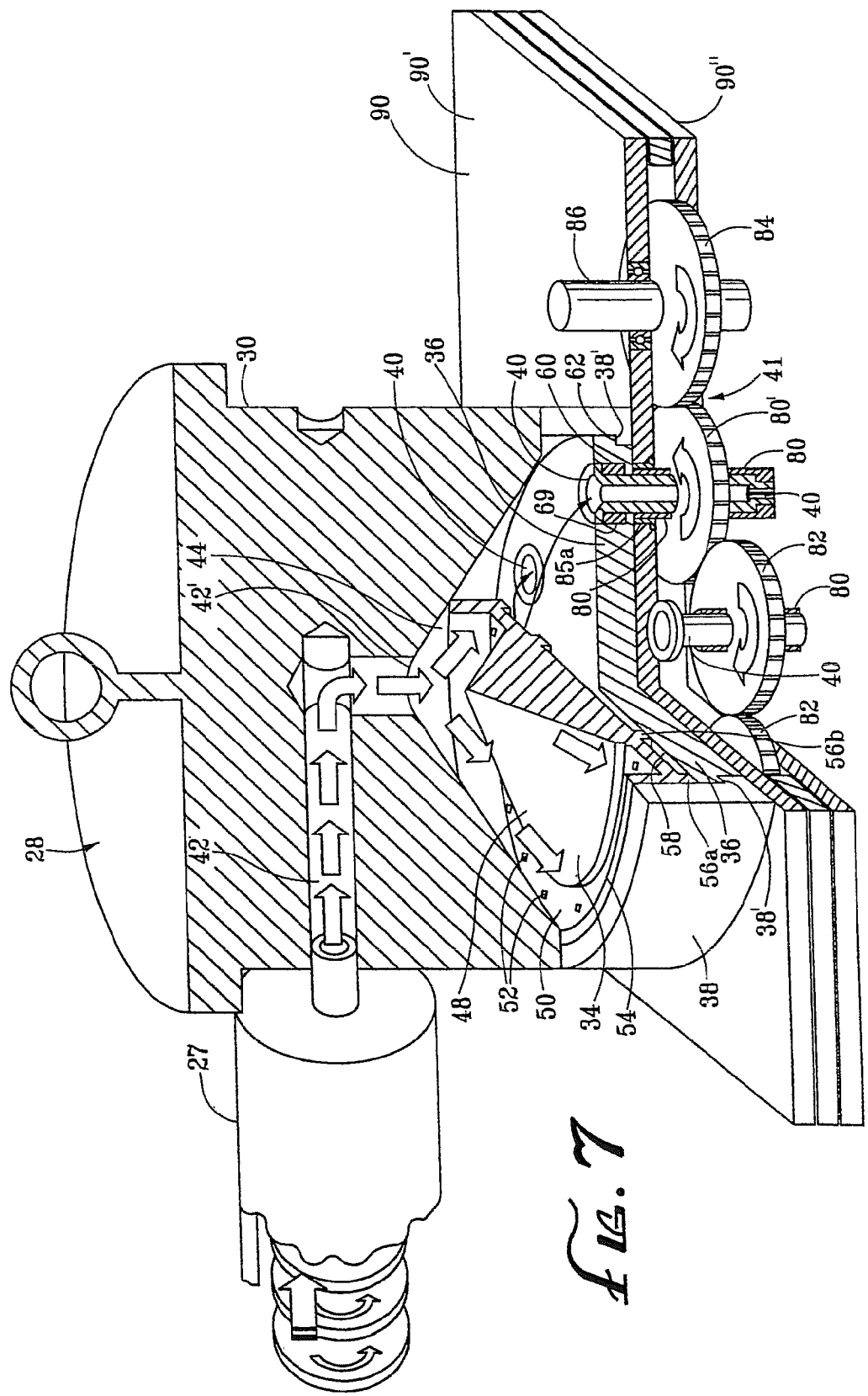
FIG. 7 is a partially cut away perspective view of the spin pack and drive assemblies of the present invention.
Figure 8:
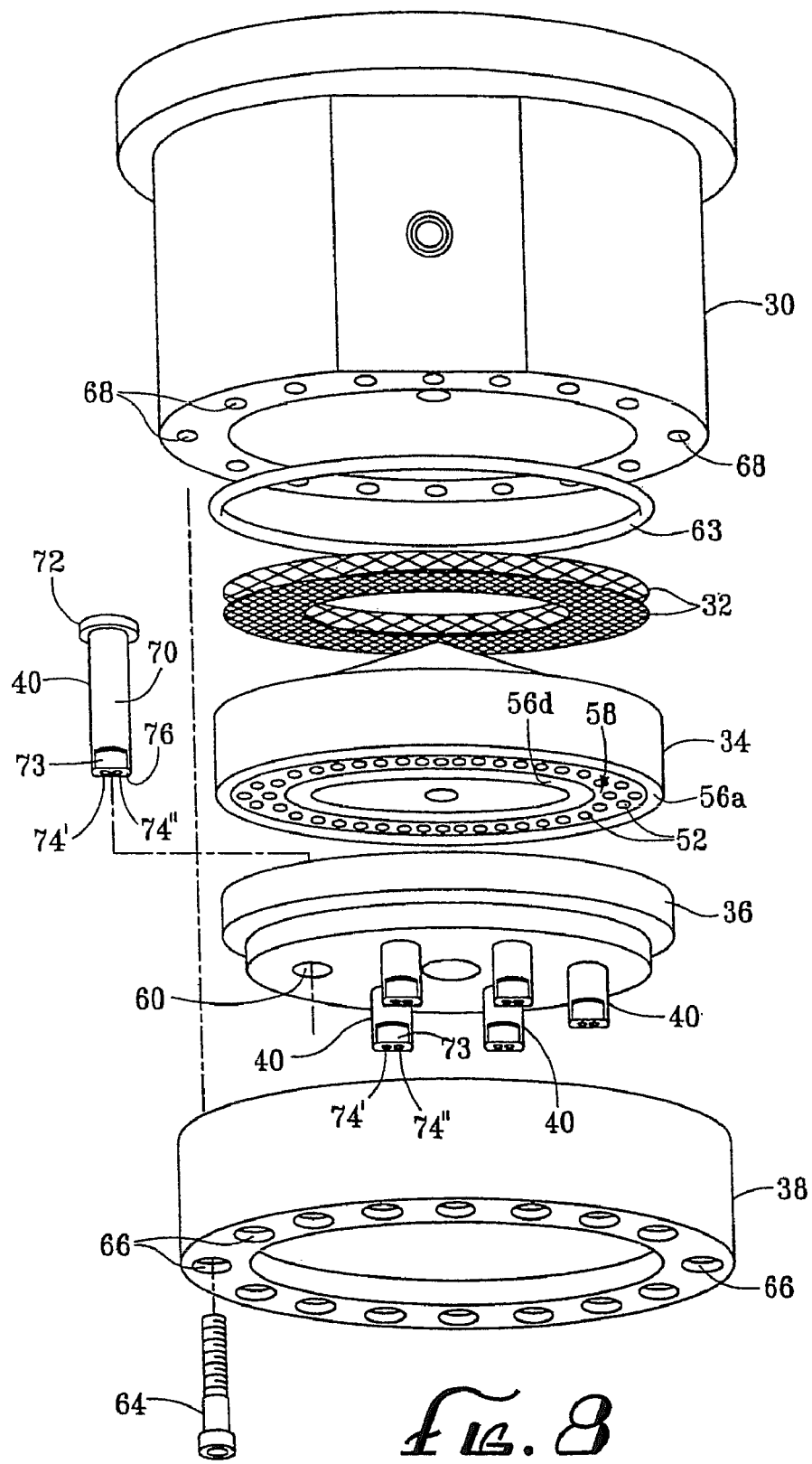
FIG. 8 is an exploded perspective view of the spin pack assembly employed in the manufacturing process of the present invention.

The spin pack assembly 28 employed in the present invention is illustrated in FIGS. 7-9 and comprises a main housing 30, a pair of stacked filter screens 32, a breaker plate 34, a spinneret 36, spinneret housing 38, the rotating dies 40 and a drive assembly 41. The main housing 30 of the spin pack assembly defines a material flow channel 42 therein for directing the molten nylon material from nozzle 27 to a conical chamber 44 and onto the breaker plate 34. The breaker plate 34 defines a centrally disposed inner conical portion 48 projecting upwardly within chamber 44 directly below the outlet end 42' of flow channel 42 and an outer annular portion 50 having a plurality of apertures 52 extending vertically therethrough. The upper surface of annular portion 50 is flat, horizontally disposed and preferably recessed from its perimeter edge portion 54 to accommodate the stacked filter screens 32 (not shown in FIG. 7). The underside of annular portion 50 is bordered by downwardly projecting annular ribs 56*a* and 56*b* that abut the upper surface of the spinneret 36 and thus define an annular chamber 58 between the upper surface of the spinneret 36 and the lower surface of the breaker plate 34.

The spinneret 36 is disposed within the spinneret housing 38 below the breaker plate 34 and defines a plurality of cylindrical, equidistantly-spaced, vertical channels 60 that extend through the spinneret and are in fluid communication with the annular chamber 58 and the apertures 52 in the breaker plate 34. While six such channels are shown in the spinneret 36 illustrated in the drawings, a greater or lesser number of channels could be employed. The spinneret 36 also defines an annular shoulder 62 that rests upon the upper annular surface 38' of the spinneret housing. An annular brass sealing member 63 is disposed between the perimeter edge portions of the main housing 30 and spinneret housing 38. A plurality of locking bolts 64 (only one being shown) extend through apertures 66 in the spinneret housing 38 and a corresponding plurality of aligned threaded apertures 68 in the lower portion of the main housing 30 to secure the spinneret housing 38 to the main housing 30 and the components of the spin pack assembly 28 in place as seen in FIG. 7.

The vertical channels 60 in the spinneret 36 each define a lower constant radius portion 60', an enlarged upper constant radius portion 60'' and a horizontal shoulder 61 for supporting an annular bushing 69 thereon. Bushings 69 are preferably formed of graphite, are held in a press fitment within the upper portion 60'' of channels 60 and each support one of the extrusion dies 40 thereon (see FIG. 9).

The rotatable extrusion dies 40 each define a cylindrical body portion 70, an upper cylindrical radial flange 72, a pair of opposed flat surfaces 73 adjacent the lower end thereof and a die hole configuration 74 in the lower end 76 thereof. In the production of the preferred embodiment of cutting line 10 illustrated in FIGS. 3B-3D, each die 40 defines a pair of spaced circular die holes 74' and 74'' in the lower end 76 thereof through which the molten nylon is extruded to form the cutting line 10 (see FIGS. 3A and 10). As will be discussed later herein, other die hole configurations can be employed to produce other cutting line configurations.

The upper radial flange 72 on the extrusion dies 40 rest on the upper surface bushings 69 and are substantially flush with the upper surface of the spinneret 36 (see FIG. 10). The body portion 70 of each die 40 extends through one of the bushings 69 and below the spinneret 36 and is securely held within a steel drive sleeve 80 below the bushing 69. In the embodiment of the drive assembly 41 shown in the drawing, the drive sleeves 80 each define an opening 83 in the lower end thereof shaped so as to receive the lower end portion 76 of one of dies 40 such that the perimeter wall defining opening 83 abuts and mates with the opposed flat surfaces 73 on the lower end of the die 40 thereby keying the sleeves 80 to the dies 40 such that rotation of the sleeves will effect corresponding rotation of the dies. Other means of securing the sleeves to the dies could also be employed.

Each drive sleeve 80 has a toothed gear 82 secured about the outer surface thereof below the spinneret housing 38. Each of the gears 82 is engaged with at least one of the other gears and one of the gears (designated 82') additionally engages a toothed drive gear 84. Drive gear 84 is coupled to a drive motor 86 via drive shaft 88 and bevel gear 89 (see FIGS. 5 and 9) such that activation of the drive motor will effect rotation of the drive gear 84, causing each of the gears 82 and attached drive sleeves 80 to rotate. Rotation of the drive sleeves, effects corresponding rotation of the individual dies 40. A pair of upper and lower brass bushing 85*a* and 85*b* are mounted in the upper and lower walls 90*a* and 90*b* of the gearbox housing 90 about each of the drive cylinders 80 (see FIG. 9). The drive sleeves 80 and gears 82 and 84 comprise the drive assembly 41 and are housed within the gearbox housing 90 below the spinneret housing 38. A five-horsepower servomotor has been employed as the drive motor 86 to rotate dies 40 at speeds from about 750 to 2,500 rpm depending on the desired size and profile of the line.

In the production of cutting line 10, the molten nylon material passes through channel 42 in the main housing 30, onto the conical portion 48 of the breaker plate 46 and is uniformly distributed over the annular outer portion 50 of the breaker plate. The molten material then passes through the apertures 52 in the breaker plate, into the annular chamber 58 between the breaker plate and spinneret 36 and through the rotating dies 40 carried by the spinneret 36. As the molten nylon material is extruded through the die holes 74' and 74'' in the bottom of each of the rotating dies 40, a plurality of pairs of molten elongated cylindrical monofilament strands are formed and the two strands 10*a* and 10*b* in each pair are overlapping and twisted together to define a plurality of lengths of cutting line 10. As seen in FIGS. 3B and 3D, each of the formed lengths of cutting line 10 defines a pair of opposed inwardly directed and generally V-shaped troughs 12*a* and 12*b* that terminate in fused seams 14*a* and 14*b* and extend continuously in opposed helical dispositions about and along the line. The number of the lengths of line 10 produced corresponds to the number of dies 40 carried by the spinneret 36.

When the nylon material is extruded through the plurality of rotating dies 40 to form the corresponding plurality of pairs of twisted molten strands, each of the lines 10 formed by each such pair of twisted strands is directed downwardly from its associated die 40 into a quench tank 100 filled with water maintained within the range of about 40° to 100° F., depending on the material being used, to effect crystallization of the nylon strands as they pass through the cooler water. If the line 10 is being constructed of the preferred nylon copolymer identified above, the water in tank 100 should be maintained within the range of 60° to 80° F. For line constructed of this material having smaller diameters, such as 0.065-0.080 in., the water temperature should preferably be about 70° to 80° F. and most preferably at about 80° F. For larger line having diameters of about 0.095-0.105 in., the water temperature should preferably be at about 60° to 70° F. and most preferably at about 60° F. If the line were being formed of a nylon homopolymer, the water temperature need not be quite as cool as nylon homopolymers crystallize more quickly. For example, if the aforesaid nylon homopolymer no. 2065 were being used, the water should be maintained from about 70° to 100° F. Because this material crystallizes quickly, preferred water temperature of about 70° to 80° F. with line having smaller diameters of about 0.065-0.080 in. and most preferably the temperature should be about 70° F. With line having larger diameters, such as 0.095-0.105 in., the water temperature should be about 80° to 100° F. and most preferably about 80° F. A water cooling apparatus (not shown) is employed in tank 100 to maintain the water at the desired quenching temperature.

Within tank 100, the lines 10 are initially directed downwardly about a series of rollers 102 that are mounted in a spaced curvilinear disposition in a carriage 104 adjustably mounted in the lower upstream end of the quench tank 100. The surface of the first roller 102' includes a plurality of raised annular ridges 106 that are spaced apart and define a series of finger guides for aligning the pairs of twisted strands in a spaced parallel array. The guides could also be formed by a plurality of annular channels in the surface of roller 102'. The pairs of joined strands extend from carriage 104 in parallel alignment proximate the bottom of tank 100 and about a second plurality of rollers 108 mounted on a second carriage 110. The last roller 108' on carriage 110 is also preferably provided with a plurality of guides 112 similar to guides 106 on roller 102'. From carriage 110, the pairs of fused strands are directed outwardly of the quench tank 100, and through a sponge assembly 114 that strips excess water from the fused strands and is provided with a comb guide to maintain the alignment of the now formed lines 10 to a first roll stand 116. Roll stand 116 pulls the parallel array of the forming lines 10 from the extrusion dies 40 through the quench bath 100 and cooperates with a second roll stand 118 and a third roll stand 120 to move the lengths of line 10 through the forming process as will be explained.

Figure 6:
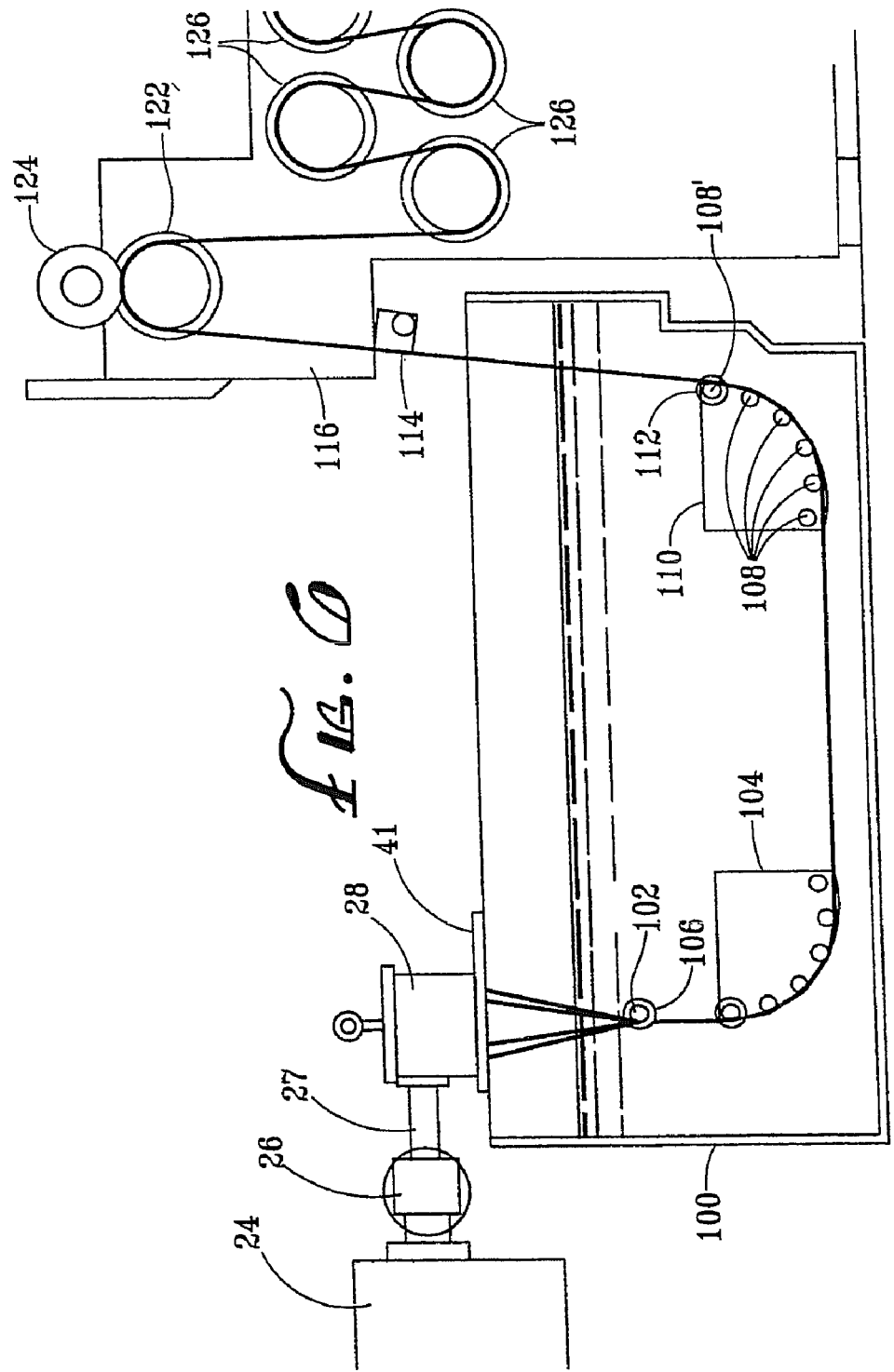
FIG. 6 is an enlarged schematic view of the filter assembly, metering pump, spin pack assembly, drive assembly and first quench bath illustrating the initial forming steps of the noise attenuating cutting line in accordance with the present invention.

Roll stand 116 comprises an elevated driver roller 122 and a pinch roller 124 for pulling the joined strands upwardly from tank 100, and two rows of vertically and laterally spaced additional drive rollers 126 which cooperate with rollers 122 and 124 to pull the pairs of joined strands through the quench bath. The drive rollers in each of the three roll stands are preferably constructed with stainless steel outer surfaces, while the pinch rollers preferably have a hard rubber surface to provide the desired gripping and durability characteristics. As seen in FIGS. 1 and 6, the parallel array of spaced lines 10 extend from tank 100 between driver roller 122 and pinch roller 124, downwardly therefrom and about the two rows of drive rollers 126 and laterally therefrom into a first oven 128. The second roll stand 118 is disposed downstream of oven 128 and is comprised of two rows of vertically and laterally spaced drive rollers 130 and a pinch roller 131. Roll stand 118 pulls the parallel array of lines 10 from the first roll stand 116 and through oven 128.

To obtain the desired physical properties in line 10, it is important both to stretch the line while it is being heated in oven 128 and to obtain the desired degree of crystallization of the nylon polymer material prior to heating and stretching. Stretching the line during the heating step provides parallel orientation of the molecular structure within the line 10 and is achieved by providing a differential between the rotational velocities of the drive rollers 122 and 126 in the first roll stand 116 and the drive rollers 130 in the second roll stand 118. All of the drive rollers in the three roll stands are preferably of the same size. Accordingly, by rotating the drive rollers 130 in the second roll stand 118 more rapidly than the drive rollers 122 and 126 in the first roll stand 116, the lines 10 are stretched as they are pulled through oven 128.

The amount of crystallization which occurs in the molten strands prior to heating and stretching is a function of the particular material being used, the temperature of the quench water and the quench time (time during which the line is submerged in the quench tank). The quench time depends on the velocity at which the lines are pulled through the tank and the length of underwater travel. From a commercial standpoint, it is desirable to maximize line output per unit time. This is preferably achieved in the present invention by extending the length of the quench tank 100 which allows the roll stands to operate at higher rotational velocities without decreasing quench time. It has also been found to be desirable to operate the roll stands at constant velocities and thus variations in the line material can be most easily accommodated by variations in the temperature of the quench water.

The vertical spacing between the lower face of the extrusion dies 40 in the spin pack assembly 28 and the surface of the water in tank 100, which is referred to as the air gap, is from 1.5 to 3.0 in. depending on the viscosity of the material being used, the diameter of the individual strands being extruded and the drawdown ratios employed. The larger the diameter of the strands being formed and the less the drawdown ratio, the shorter the air gap. More viscous melts require larger air gaps. The melt temperature is about 420° to 480° F. and the quench tank 100 is about ten feet in length by three feet in depth. As the melt passes through the recommended air gap, the drive assembly 41 is twisting the molten strands approximate 3 to 3½ times tighter than actually desired. Because of drawdown, the greater number of twists are needed in the first stage of the process than in the final product. At this point in the process, the strands are twisted from approximately 45 to 80 twists per foot. The tightly twisted strands will undergo a diameter reduction, melt draw, until they contact the quench water. FIG. 3C illustrates the configuration of the preferred embodiment of cutting line 10 as it passes through quench tank 100.

The rotational velocity of the drive rollers in the first roll stand 116 is 38.4 feet per minute for 0.095 diameter line. For different sized line, this speed could vary somewhat. As the diameter of the line decreases, line speed will increase. To provide the proper orientation of the molecular structure of the two stands in each length of line 10 so as to achieve the desired line length strength and durability characteristics, oven 128 is maintained at about 580° F. and the ratio of the relative rotational speeds of the drive rollers 130 in the second roll stand 118 to the speed of the drive rollers 122 and 126 in the first roll stand 116 is about 3.15 to 1. Accordingly, the rotational speed of the drive rollers 122 and 126 in the second roll stand 118 in the present example is 121.2 feet per minute. The tightly twisted strands are now necked down in diameter size and the twists are stretched to 15 to 25 twists per foot. The final appearance of the preferred embodiment of the cutting line 10 is illustrated in FIG. 3D.

Orienting the strands by aforesaid stretching and heating places considerable stress on the strands. To provide the desired strength and durability in the final product, it is desirable to relieve this stress. This is accomplished in the present invention by subjecting the pairs of bonded strands 10a and 10b to a second heating step. In the second heating step, however, the joined strands are in a relaxed state as opposed to being stretched during the first heating step. To provide the second heating step, a second oven 132 is disposed downstream of the second roll stand 118. The third roll stand 120 is positioned downstream of the second oven 132 to pull the lengths of line 10 through oven 132. Roll stand 120 preferably comprises a pinch roller 134 and three drive rollers 136 vertically and horizontally spaced apart as shown in FIG. 2. To pull the lines 10 through oven 132 in a relaxed state, the drive rollers of roll stand 120 are rotated at a rate of about two to three percent slower than the drive rollers 130 of the second roll stand 118. The second oven 132 is maintained at a slightly lower temperature than oven 128, preferably about 540° F.

A second quench tank 138 is disposed downstream of the third roll stand 120 to moisten the monofilament line prior to spooling as spooled line is inhibited from absorbing the moisture in the air which is desirable in freshly extruded nylon line from a strength standpoint. A suitable line guide 140 is provided in the lower portion of quench tank 138 to define an underwater path for the line through tank 138. The water in tank 138 is maintained at about the same temperature as the water in tank 100 to cool the formed line prior to spooling. Finally, a conventional spooling assembly 142 is deployed in the assembly line downstream of quench tank 138 wherein each of the lines 10 formed by the aforesaid process are individually wrapped about separate spools 144 for storage and shipment. In the example set forth above, six separate spools would be wound with line 10 by assembly 142.

In the production of cutting line 10, the size and spacing of the die holes 74' and 74" depend on the desired size and configuration of the cutting line 10. As in the extrusion of conventional single-strand monofilament line, the diameters of the individual die holes should be at least 50% greater than the desired final strand diameter. Examples of relative diameter size are shown in the following table:

| Strand Size (in.) | Die Hole Size (in.) |
|---|---|
| .065 | .176 |
| .080 | .176 |
| .095 | .260 |
| .105 | .260 |
| .130 | .281 |

Variations in the individual strand size are obtained with a given diameter hole in the die, as seen above, by regulating the metering pump 26 and the line speed as in the manufacture of conventional single-strand monofilament line. Thus, by varying the size and spacing between the two die holes 74' and 74" and adjusting the metering pump 26, the size of the individual extruded strands 10a and 10b and the size and cross-sectional configuration of the line 10 formed by the bonding of the two strands can be varied. By varying the tightness of the twists in line 10, the angle of the helixes defined by the two troughs 12a and 12b in the line can be varied. Both the cross-sectional configuration of the line and the angles of helixes defined by the troughs therein contribute to the noise attenuation characteristics of the cutting line 10.

FIG. 4 illustrates an enlarged end view of the preferred embodiment of the cutting line 10 shown in FIGS. 3B and 3D identifying the central axis X and the major and minor diameters of the cutting line. As seen in FIG. 4, the cutting line 10 defines a major diameter D and a minor diameter d. The term major diameter as used herein defines the larges diameter across the cutting line as measured from crest to crest. Thus, the major diameter effectively defines the size of the cutting line and is the figure used in describing the diameter of the line. The term minor diameter as used herein is the smallest diameter across the line as measured from seam to seam. Both the major and minor diameters pass through the central longitudinal axis X of the cutting line 10.

Different die hole configurations and spacings will produce different cross-sectional line configurations and will vary the noise attenuating characteristics of the cutting line. For example, the preferred embodiment of cutting line 10 illustrated in FIGS. 3B and 3D is produced using the die hole configuration illustrated in FIG. 3A. Using a diameter of 0.140 in. for die holes 74' and 74" and a spacing between the two die holes of 0.0625 in., a cutting line 10 was produced having a major diameter D of 0.095 in. and a minor diameter d of 0.078 in. The line 10 defined 20 twists per linear foot. In a test conducted at a location having a background noise level of 58.8 decibels, the noise level of a rotary trimmer head driven by an electronic motor at a speed of 5,000 rpm with no load (without any cutting line) was measured at 71.3 decibels. Using the above-described preferred embodiment of cutting line 10, the noise level measured 88.3 decibels. Using conventional round monofilament line having a diameter of 0.095 in. (typical in lawn and garden applications), the noise level measured 101.3 decibels.

For a second test, the two die holes 74' and 74" were moved together into an overlapping relationship so as to effectively form a single die hole having the configuration illustrated in FIG. 11A. By adjusting the metering pump, a cutting line was produced having the original 0.095 in. major diameter D and an increased, albeit unmeasured, minor diameter d as seen in FIG. 11B. The line defined 20 twists per linear foot. The measured decibel level of that line was 93.1.

In a third test, a connecting channel was added between the two spaced die holes illustrated in FIG. 3A. The resultant die hole configuration is seen in FIG. 12A. Using the die hole configuration illustrated in FIG. 12A and rotating the die so that the bonded strands extruded therethrough define 20 twists per linear foot, the line illustrated in FIGS. 12B and 12C was produced. The line also had a major diameter of 0.095 in. Using the same testing parameters, that line generated a decibel reading of 89.3.

In a fourth test using the same die hole configuration illustrated in FIG. 3A, the metering pump 26 and drive assembly 41 were adjusted so as to produce a length of cutting line having a major diameter of 0.090 in., a minor diameter of 0.070 in. and defining 25 twists per linear foot. Using the same test parameters, the decibel reading was reduced to 87.7. While this line was quieter than the 0.095 in. diameter line of the first test, reducing the size of the line will cause the line to wear out more quickly and reducing its mass will adversely affect its cutting ability.

From such tests, it is apparent that with the preferred embodiment of line 10, which is formed of two individual strands, circular in cross-section and bonded together as previously described, increasing the difference between the major diameter and minor diameter for a given line size enhances the noise attenuation of the line. However, if this difference in relative diameters is achieved through a significant loss of mass, the benefit of increased noise attenuation is offset by a decrease in cutting ability as well as an increase in wear rate. This relative difference in major and minor diameters can be expressed as a percentage of line size as follows $$\frac{D-d}{D}.$$

For the preferred embodiment of the flexible cutting line of the present invention in 0.095 in. diameter size, this relative difference in diameters is 0.095-0.078/0.095, which equals 0.1789 or 17.89%. For this and other line sizes having the configuration of the preferred embodiment of line 10, this relative difference in diameters should be within the range of about 0.17 to 0.20 or 17-20%. Line exhibiting a percentage outside this range will suffer from either reduced noise attenuation or from diminished cutting ability.

The addition of a thin web portion connecting the two die holes, as seen in FIG. 12A, also appears to detract from the noise attenuating characteristics of the resultant line, albeit only slightly. It is believed that the material passing through the channel between the two die holes flows into the seam or trough areas of the line as the two molten strands are twisted together, increasing slightly the minor diameter of the line and detracting slightly from the noise attenuating characteristics of the line.

FIGS. 14B and 14C illustrate an example of cutting line formed by three strands twisted and bonded together about and along the central axis X of the line. The particular line illustrated therein was produced from the die hole configuration illustrated in FIG. 14A through which three generally teardrop-shaped molten strands joined at their inner ends are extruded and twisted together. The strands in the formed line are equiangularly spaced about axis X to balance the line. In a test that was run with 0.095 in. diameter line having the configuration illustrated in FIGS. 14B and 14C and defining 20 twists per linear foot, a decibel reading of 90.8 was measured. The drop in noise attenuation exhibited by the line as compared to the attenuation exhibited by the line of FIGS. 3B and 3D is believed to result from the relatively sharper edges created by the formed teardrop shaped strands as contrasted with the rounded surfaces of the preferred embodiment.

The die hole configurations employed in the present invention include the preferred configuration of totally separate die holes (see, e.g., FIG. 3A), interconnected die holes wherein the holes are connected by thin web portions (see, e.g., FIG. 12A) or are connected at adjacent edge portions (see, e.g., FIGS. 13A and 14A), and die holes that overlap to the extent that a single die hole is formed which itself defines a major and minor axis so as to impart a corresponding noise attenuating configuration to the line when employed in the process of the present invention (see, e.g., FIG. 11A). For uniformity of description, the monofilament material being extruded through the enlarged hole portions of each of such die hole configurations forms what is referred herein to as a strand whether or not the strands formed by each die are actually separated as they exit the die, interconnected or overlapping. In addition, while only a single multi-strand configuration has been illustrated in the drawings (FIGS. 14A-14C), other such configurations could be produced in accordance with the present invention. It should be noted that such a line configuration does not have major and minor diameters as those terms are defined herein. The effective size of line formed in accordance with the present invention with more than two strands would be the diameter of the smallest circle C (see FIG. 14B) that circumscribes the line. Thus, such a line has less mass for a given line size than either conventional line or the preferred embodiment of the new noise attenuating line. Accordingly, for certain applications in which such multistrand noise attenuating line is employed, it may be necessary to use somewhat oversized line. Thus, while such line may be noticeably quieter than conventional line, the two-strand line of the present invention exhibits superior performance and is preferred. The embodiment illustrated in FIGS. 13B and 13C is merely illustrative of different line configurations that can be provided in accordance with the present invention. It should also be noted that different die hole configurations can be concurrently employed in different dies in the present invention to simultaneously produce one or more cutting lines of a different size and/or configuration.

Increasing the number of twists in the cutting line per linear foot also enhances the noise attenuating characteristics of the cutting line of the present invention. Preliminary testing has indicated that the bonded strands in the cutting line of the present invention should define at least 15 twists per linear foot of line and, more preferably, at least 20 to 25 twists per linear foot.

Yet another embodiment of the present invention is illustrated in FIGS. 15A-15D. In this embodiment, unlike the prior embodiments, line 10 is formed from a single strand of molten material twisted about its own central axis X. The single strand is preferably formed of the same materials as the above-discussed embodiments but is extruded through a die 200 having a single hole configuration as illustrated in FIG. 15A. The die 200 differs from dies 40 in that it only defines a single aperture therein that extrudes a single strand. Otherwise, die 200 is configured as dies 40 and is held and rotated in the spinneret 36 in the same manner as dies 40. The preferred hole configuration for die 200 is that of an oblate spheroid in cross-section (i.e., resembling that of a football) as seen in FIG. 15A.

As the molten material is extruded through the rotating die 200 and passes through the same above-described cooling, stretching and heating process, the resultant line 202 is formed of a single strand that is slightly out-of-round (i.e., slightly oblate) (see FIG. 15D) and is twisted about its own central axis X. By way of example, the ratio or the minor diameter d of line 202 to the major diameter D, which defines the effective size (diameter) of the line, has been measured at 1:1.18. Other die hole shapes could be employed in die 200 that when rotated during extrusion, would provide a strand having an out-of-round cross-section that upon curing, will produce a noise attenuating cutting line. As with cutting line 10, line 202 should define at least 15 twists per linear foot of line and, more preferably, at least 20 to 25 twists per linear foot. Unlike line 10, line 202 does not define opposed troughs.

As a result of their differences in configuration, a length of cutting line 10 having a given major diameter D formed by twisting together two molten strands will have less mass than an equal length of line 202 of the same major diameter. This difference is apparent from comparing the line cross-sections of the lines in FIGS. 3B and 15B. As a result, line 202 will have superior vegetation cutting ability than line 10 of the same major diameter. However, because of their differences in cross-sectional configuration, line 202 will not have the same degree of noise attenuation as the line formed from two strands. Thus, while this embodiment of the invention does not quite achieve the noise attenuation levels exhibited by similarly sized line formed of two twisted molten strands, it provides excellent cutting ability and simplifies production, particularly during startup in that one does not have to coordinate the joining together of two strands and is quieter than conventional cutting line.

While single-strand twisted cutting line has been manufactured in the past to attenuate the noise generated by the line during use, such line was produced by means of one or more secondary processes. Following the extrusion of a single strand and the cooling of the forming line, the line is subjected to a cutting or reheating and twisting step to create a twisted configuration. Such a process is both time-consuming and expensive. By utilizing a rotating die so as to twist the strand while still in a molten state, Applicant has provided a very economic process for producing a single-strand cutting line which exhibits noise attenuation and excellent cutting properties. By forming the line by means of twisting together two separate molten strands, as in the formation of line 10 of the prior embodiment, superior noise attenuation is achieved without the loss of sufficient mass to significantly impair the cutting ability of the line.

These and other changes and modifications may be made in carrying out the present invention without departing from the spirit and scope thereof. Insofar as these changes and modifications are within the purview of the appended claims, they are to be considered as part of the present invention.

What is claimed is:

1. A process for forming a flexible noise attenuating cutting line for use in rotary vegetation trimmers comprising the steps of extruding a molten strand of monofilament through a die having an oblately-shaped die hole therein, rotating said die during said extruding step to twist the strand about a central axis so as to form a twisted length of molten monofilament oblately-shaped in cross section, directing said twisted length of molten monofilament into a cooling quench bath and pulling said twisted length through the bath to effect crystallization thereof whereby a flexible noise attenuating monofilament cutting line is formed having a slightly out-of-round cross-section and being twisted about and along its entire length.

2. A process for forming a flexible noise attenuating cutting line for use in rotary vegetation trimmers comprising the steps of extruding a molten strand of monofilament through a die having an oblately-shaped die hole therein, rotating said die during said extruding step to twist the strand about a central axis so as to form a twisted length of molten monofilament oblately-shaped in cross section, directing said twisted length of molten monofilament into a cooling quench bath and pulling said twisted length through the bath to effect crystallization thereof, concurrently stretching and heating the twisted length and then heating the length in a relaxed disposition whereby a flexible noise attenuating monofilament cutting line is formed having a slightly out-of-round cross-section and being twisted about and along its entire length.

3. The process of claim 1 wherein during said extrusion step, said die is rotated at speeds from about 750 to 2,500 rpm.

4. The process of claim 2 wherein during said extrusion step, said die is rotated at speeds from about 750 to 2,500 rpm.

5. The process of claim 2 wherein during said extrusion step, said die is rotated at a speed sufficient to impart from approximately 45 to 80 twists per foot in said molten strand and wherein said stretching and heating step comprises pulling said twisted length from said cooling quench bath at a first velocity, directing said twisted length from said bath to a heated oven and pulling said length through said oven at a second velocity, said second velocity being sufficiently greater than said first velocity so as to reduce the number of twists in the strand to about 15 to 25 twists per linear foot.

6. The process of claim 1 wherein said die is rotated during said extrusion step at a speed sufficient to form in said single twisted length of molten monofilament approximately 3.0-3.5 times the number of twists per linear foot formed in said cutting line.

7. The process of claim 2 wherein said die is rotated during said extrusion step at a speed sufficient to form in said single twisted length of molten monofilament approximately 3.0-3.5 times the number of twists per linear foot formed in said cutting line.

8. The process of claim 6 wherein during said extrusion step, said die is rotated at speeds from about 750 to 2,500 rpm.

9. The process of claim 7 wherein during said extrusion step, said die is rotated at speeds from about 750 to 2,500 rpm.

* * * * *